United States Patent
Doi et al.

(10) Patent No.: US 6,207,766 B1
(45) Date of Patent: Mar. 27, 2001

(54) ROOM TEMPERATURE-SETTING COMPOSITIONS

(75) Inventors: Takao Doi; Takashi Watabe; Tomoko Matsumoto; Tatsuo Onoguchi; Kaori Tsuruoka, all of Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/147,417

(22) PCT Filed: Apr. 20, 1998

(86) PCT No.: PCT/JP98/01803
§ 371 Date: Dec. 21, 1998
§ 102(e) Date: Dec. 21, 1998

(87) PCT Pub. No.: WO98/47939
PCT Pub. Date: Oct. 29, 1998

(30) Foreign Application Priority Data

Apr. 21, 1997 (JP) .................................................. 9-103460
Sep. 30, 1997 (JP) .................................................. 9-266809

(51) Int. Cl.$^7$ ............................................ L08L 71/02
(52) U.S. Cl. ........................... 525/403; 525/404; 528/29; 528/31; 528/25; 528/32
(58) Field of Search .................................... 525/403, 404; 528/25, 29, 31, 32

(56) References Cited

U.S. PATENT DOCUMENTS 4,593,068 * 6/1986 Hirose et al. ..................... 525/100
5,223,583 6/1993 Higuchi et al. .

FOREIGN PATENT DOCUMENTS 58-10418 2/1983 (JP) .
58-10430 2/1983 (JP) .
3-47825 2/1991 (JP) .
7-90169 4/1995 (JP) .
7-165891 6/1995 (JP) .
7-216216 8/1995 (JP) .
8-59961 3/1996 (JP) .

* cited by examiner

Primary Examiner—Robert Dawson
Assistant Examiner—Jeffrey B. Robertson
(74) Attorney, Agent, or Firm—Oblon, Spivak, McClelland, Maier & Neustadt, P.C.

(57) ABSTRACT

The present invention provides a room temperature-setting composition containing a polyoxyalkylene polymer (A), having a molecular weight of from 8000 to 50000 and having hydrolyzable silicon groups of the following formula (1), which comprises, as an essential component, the polyoxyalkylene polymer, having a molecular weight of from 8000 to 50000 and having hydrolyzable silicon groups of the formula (1), wherein a is 3 and a room temperature-setting composition containing a polyoxyalkylene polymer (A) having a molecular weight of from 8000 to 50000 and having hydrolyzable silicon groups of the formula (1), which comprises, as essential components, the polyoxyalkylene polymer having a molecular weight of from 8000 to 50000 and having hydrolyzable silicon groups of the formula (1) wherein a is 3, and a polymer (B) made by polymerization of a polymerizable unsaturated group-containing monomer (C):

$$-SiX_aR^1{}_{3-a} \qquad (1)$$

wherein $R^1$ is a $C_{1-20}$ substituted or unsubstituted monovalent organic group, X is a hydroxyl group or a hydrolyzable group, a is 1, 2 or 3, provided that when more than one $R^1$ exist, the plurality of $R^1$ may be the same or different, and when more than one X exist, the plurality of X may be the same or different.

12 Claims, No Drawings

ROOM TEMPERATURE-SETTING COMPOSITIONS

TECHNICAL FIELD

The present invention relates to a room temperature-setting composition, having an excellent curing property and being capable of showing an adequate strength property in a short period of time.

BACKGROUND ART

A polyoxyalkylene polymer having hydrolyzable silicon groups at the terminals is a polymer in a liquid state at room temperature, and its cured product maintains flexibility at a relatively low temperature. Therefore, the polymer has properties suitable for e.g. a sealant, an adhesive or a coating composition.

Such a polymer may, for example, be a polymer having hydrolyzable silicon groups at the terminals, as disclosed in JP-A-3-72527, JP-A-3-47825, JP-B-58-10418 or JP-B-58-10430.

JP-A-3-72527 and JP-A-3-47825 disclose a polymer having hydrolyzable silicon groups formed by bonding two hydrolyzable groups to a silicon compound. Such a polymer is excellent in elongation or flexibility, but poor in curing property. There were problems that such a polymer was poor in internal curing property particularly under a low temperature condition, and a cured product capable of showing an adequate strength property in a short period of time could not be obtained.

Further, JP-B-58-10418 and JP-B-58-10430 disclose a polymer having a relatively low molecular weight of at most 6000, which is a polymer having hydrolyzable silicon groups formed by bonding three hydrolyzable groups to a silicon atom. Such a polymer is insufficient in elongation or flexibility and poor in curing property. There were problems that such a polymer was poor in internal curing property particularly under a low temperature condition, and a cured product capable of showing an adequate strength property in a short period of time could not be obtained.

Further, such a polymer generally has a drawback that it is poor in bonding property. Therefore, it was difficult to use the polymer solely particularly for e.g. an elastic adhesive which requires bonding strength. JP-B-2-35793 proposes a method in which both an acrylic polymer and a polymer having hydrolyzable silicon groups made by bonding two hydrolyzable groups to a silicon atom are used, in order to improve the strength. However, the polymer composition obtained by this method has drawbacks that it has a low curing property, and it takes a long period of time for bonding.

DISCLOSURE OF INVENTION

The present inventors have conducted extensive researches on a polymer having hydrolyzable silicon groups. As a result, a composition has been found, wherein flexibility or work efficiency does not significantly deteriorate, and internal curing property of the cured product improves, whereby the present invention has been accomplished. Further, a composition has been found which gives a cured product wherein the curing property is excellent so that an adequate bonding property can be obtained in a short period of time, particularly the time for bonding is short, and bonding property to various materials is excellent, whereby the present invention has been accomplished.

Namely, the present invention provides a room temperature-setting composition containing a polyoxyalkylene polymer (A) having a molecular weight of from 8000 to 50000 and having hydrolyzable silicon groups of the following formula (1), which comprises, as an essential component, the polyoxyalkylene polymer having a molecular weight of from 8000 to 50000 and having hydrolyzable silicon groups of the formula (1) wherein a is 3; and a room temperature-setting composition containing a polyoxyalkylene polymer (A) having a molecular weight of from 8000 to 50000 and having hydrolyzable silicon groups of the formula (1), which comprises, as essential components, the polyoxyalkylene polymer having a molecular weight of from 8000 to 50000 and having hydrolyzable silicon groups of the formula (1) wherein a is 3, and a polymer (B) made by polymerization of a polymerizable unsaturated group-containing monomer (C).

$$—SiX_aR^1{}_{3-a} \qquad (1)$$

wherein $R^1$ is a $C_{1-20}$ substituted or unsubstituted monovalent organic group, X is a hydroxyl group or a hydrolyzable group, a is 1, 2 or 3, provided that when more than one $R^1$ exist, the plurality of $R^1$ may be the same or different, and when more than one X exist, the plurality of X may be the same or different.

BEST MODE FOR CARRYING OUT THE INVENTION

Polyoxyalkylene Polymer (A)

A polyoxyalkylene polymer (A) having hydrolyzable silicon groups of the formula (1) has been proposed in, for example, JP-A-3-47825, JP-A-3-72527 or JP-A-3-79627.

As mentioned hereinafter, the polyoxyalkylene polymer (A) is preferably produced by using a polyoxyalkylene polymer having functional groups as a material, and optionally introducing hydrolyzable silicon groups to the terminals by means of organic groups.

As the material polyoxyalkylene polymer, the hydroxyl group terminated one made by reacting e.g. monoepoxide with an initiator in the presence of a catalyst, is preferred.

As the initiator, a hydroxy compound having at least one hydroxyl group may, for example, be used. As the monoepoxide, ethylene oxide, propylene oxide, butylene oxide or hexylene oxide may, for example, be mentioned. Tetrahydrofuran may also be used. As the catalyst, an alkali metal catalyst such as a potassium compound or a cesium compound, a double metal cyanide complex catalyst, or a metal porphyrin catalyst may, for example, be mentioned.

In the present invention, as the material polyoxyalkylene polymer, one of high molecular weight of from 8000 to 50000 is used. Therefore, a polyoxyalkylene polymer made by multiplying by reacting a polyhalogen compound such as methylene chloride with a polyoxyalkylene polymer having a relatively low molecular weight which is made by using e.g. an alkali catalyst; or a polyoxyalkylene polymer made by using a double metal cyanide complex catalyst, can be used.

Further, in the present invention, as the material polyoxyalkylene polymer, it is preferred to use one having a molecular weight of from 8000 to 50000 and a $M_w/M_n$ of at most 1.7. The $M_w/M_n$ is preferably at most 1.6, and particularly preferably at most 1.5.

The polyoxyalkylene polymer (A) of the present invention is preferably a polymer made by using, as a material, a polyoxyalkylene polymer having a $M_w/M_n$ of at most 1.7 which is made by polymerizing an alkylene oxide with an initiator, followed by modifying the terminals.

The polyoxyalkylene polymer made by using a double metal cyanide complex catalyst has a narrow molecular weight distribution (i.e. the value of the $M_w/M_n$ is small) as compared with a case where an alkali catalyst is used or multiplying is carried out, and when the composition made of the polyoxyalkylene polymer is cured, good curing property can be obtained. Therefore, it is particularly preferred to use the polyoxyalkylene polymer.

Therefore, the polyoxyalkylene polymer (A) of the present invention is particularly preferably the polymer made by using, as the material, a polyoxyalkylene polymer which is made by polymerizing an alkylene oxide with an initiator in the presence of a double metal cyanide complex as a catalyst, followed by modifying the terminals.

The polyoxyalkylene polymer (A) is most preferably a polymer made by using, as the material, a polyoxyalkylene polymer having a $M_w/M_n$ of at most 1.7, which is made by polymerizing an alkylene oxide with an initiator in the presence of a double metal cyanide complex as a catalyst, followed by modifying the terminals.

As the double metal cyanide complex, a complex having zinc hexacyanocobaltate as the main component, is preferred. And as the double metal cyanide complex, an ether and/or an alcohol complex is preferred. The composition may be substantially the same as one disclosed in JP-B-46-27250. As the ether, ethylene glycol dimethyl ether (glyme) or diethylene glycol dimethyl ether (diglyme) is preferred, and the glyme is particularly preferred in view of handling efficiency during production of the complex. As the alcohol, t-butanol is preferred, which is disclosed in, for example, JP-A-4-145123.

The number of functional groups of the material polyoxyalkylene polymer is preferably at least 2. In the case where flexibility is important as the cured product property, the number of functional groups of the material polyoxyalkylene polymer is particularly preferably 2 or 3. In the case where bonding property or curing property is important, the number of functional groups of the material polyoxyalkylene polymer is particularly preferably from 3 to 8.

As the material polyoxyalkylene polymer, specifically polyoxyethylene, polyoxypropylene, polyoxybutylene, polyoxyhexylene, polyoxytetramethylene or a copolymer of at least two kinds of monoepoxide, may be mentioned.

A particularly preferred material polyoxyalkylene polymer is a 2–6 valent polyoxypropylene polyol, particularly a polyoxypropylene diol or a polyoxypropylene triol. Further, in the case of using for the following method (I) or (IV), an olefin terminated polyoxyalkylene polymer such as allyl terminated polyoxypropylene monool can be used.

The polyoxyalkylene polymer (A) has hydrolyzable silicon groups of the following formula (1) at the terminals of the molecular chain or at the side chain:

$$-\text{SiX}_a\text{R}^1_{3-a} \quad (1)$$

wherein $R^1$ is a $C_{1-20}$ substituted or unsubstituted monovalent organic group, X is a hydroxyl group or a hydrolyzable group, a is 1, 2 or 3, provided that when more than one $R^1$ exist, the plurality of $R^1$ may be the same or different, and when more than one X exist, the plurality of X may be the same or different.

The polymerizable silicon groups of the formula (1) in the polyoxyalkylene polymer (A) is usually introduced to a polymer by means of organic groups. Namely, preferably the polyoxyalkylene polymer (A) has groups of the following formula (2):

$$-\text{R}^0-\text{SiX}_a\text{R}^1_{3-a} \quad (2)$$

wherein $R^0$ is a bivalent organic group, $R^1$, X and a are same as defined above.

In the formulae (1) and (2), $R^1$ is a $C_{1-20}$ substituted or unsubstituted monovalent organic group, preferably a $C_{1-8}$ alkyl group, a phenyl group or a fluoroalkyl group, particularly preferably, e.g. a methyl group, an ethyl group, a propyl group, a butyl group, a hexyl group, a cyclohexyl group or a phenyl group. When more than one $R^1$ is exist, the plurality of $R^1$ may be the same or different.

The hydrolyzable group as X may, for example, be a halogen atom, an alkoxy group, an acyloxy group, an amide group, an amino group, an aminoxy group, a ketoximate group or a hydride group.

Among these, the number of carbons of the hydrolyzable group having carbon atoms is preferably at most 6, particularly preferably at most 4. Preferred X may, for example, be a $C_{1-4}$ lower alkoxy group, particularly a methoxy group, an ethoxy group, a propoxy group or a propenyloxy group. When more than one X exist, the plurality of X may be the same or different.

a is 1, 2 or 3.

The number of hydrolyzable silicon groups in one molecule of a polymer is preferably from 1 to 8, particularly preferably from 2 to 6.

The method to introduce the hydrolyzable silicon groups to the material polyoxyalkylene polymer is not particularly limited, and the following method (I) to (IV) can be carried out.

(I) A method of introducing olefin groups to the terminals of the polyoxyalkylene polymer having hydroxyl groups, followed by reacting with hydrosilyl compounds of the following formula (3):

$$\text{HSiX}_a\text{R}^1_{3-a} \quad (3)$$

wherein $R^1$, X and a are same as defined above.

As the method of introducing olefin groups, a method is mentioned wherein the compound having an unsaturated group or a functional group is reacted with a terminal hydroxyl group of the polyoxyalkylene polymer having hydroxyl groups, followed by bonding by an ether bond, an ester bond, a urethane bond or a carbonate bond. Further, a method can also be used wherein an olefin group is introduced to the side chain of the material polyoxyalkylene polymer, by adding an olefin group-containing epoxy compound such as allylglycidyl ether, and copolymerizing them when polymerizing alkylene oxide.

Further, when reacting a hydrosilyl compound, a catalyst such as a platinum catalyst, a rhodium catalyst, a cobalt catalyst, a palladium catalyst or a nickel catalyst may be used. A platinum catalyst such as chloroplatinic acid, platinum metal, platinum chloride or platinum olefin complex may be preferred. Further, reaction of a hydrosilyl compound is conducted preferably at a temperature of from 30° C. to 150° C., particularly preferably from 60° C. to 120° C. for several hours.

(II) A method of reacting compounds of the following formula (4) to the terminals of the polyoxyalkylene polymer having hydroxyl groups:

$$\text{R}^1_{3-a}-\text{SiX}_a-\text{R}^2\text{NCO} \quad (4)$$

wherein $R^1$, X and a are same as defined above. $R^2$ is a $C_{1-17}$ bivalent hydrocarbon group.

For the above reaction, a known urethane catalyst may be used. Further, the reaction is conducted preferably at a temperature of from 20° C. to 200° C., particularly preferably from 50° C. to 150° C. for several hours.

(III) A method of reacting polyisocyanate compounds such as tolylene diisocyanate to the terminals of the polyoxyalkylene polymer having hydroxyl groups to make isocyanate terminals, followed by reacting W groups in the silicon compounds of the following formula (5) with the isocyanate groups.

$$R^1_{3-a}\text{—SiX}_aR^2W \qquad (5)$$

wherein $R^1$, $R^2$, X and a are same as defined above. W is an active hydrogen-containing group selected from a hydroxyl group, a carboxyl group, a mercapto group and an amino group (primary or secondary).

(IV) The method of introducing olefin groups to the terminals of the polyoxyalkylene polymer having hydroxyl groups, followed by reacting the olefin groups with mercapto groups in the silicon compounds of the formula (5), wherein W is a mercapto group.

As the silicon compound of the formula (5) wherein W is a mercapto group, 3-mercaptopropyl trimethoxysilane, 3-mercaptopropyl methyldimethoxysilane, 3-mercaptopropyl dimethylmethoxysilane or 3-mercaptopropyl triethoxysilane may, for example, be mentioned.

For the above reaction, a polymerization initiator such as a radical generator may be used, and as the case requires, it is possible to carry out the reaction by radiation or heating, without using a polymerization initiator. As the polymerization initiator, a polymerization initiator such as a peroxide type, an azo type or a redox type, or a metal compound catalyst may, for example, be mentioned. As the polymerization initiator, specifically, 2,2'-azobisisobutyronitrile, 2,2'-azobis-2-methylbutyronitrile, benzoyl peroxide, t-alkyl peroxyester, acetyl peroxide or diisopropyl peroxycarbonate may be mentioned. The above reaction is conducted preferably at a temperature of from 20° C. to 200° C., particularly preferably from 50° C. to 150° C. for from several hours to several tens hours.

The curable composition of the present invention is required to contain a polyoxyalkylene polymer having "hydrolyzable silicon groups of the formula (1), wherein a is 3" (hereinafter referred to as "hydrolyzable silicon group (E)".

As the "hydrolyzable silicon group (E)", a group of the formula (1) wherein X is a $C_{1-4}$ alkoxy group, i.e., a trialkoxysilyl group having a $C_{1-4}$ alkoxy group is particularly preferred.

The polyoxyalkylene polymer having trialkoxysilyl groups is highly reactive, particularly the initial curing speed is very high.

Generally, in the hydrolysis reaction of the hydrolyzable silicon groups of the formula (1), it is considered that silanol groups are generated from the reaction with water (a silanol group-generating reaction represented by: —SiX+H$_2$O→—SiOH+HX), and further, generated silanol groups are condensated to generate a siloxane bond (condensation reaction). Once silanol groups are generated, the condensation reaction is considered to progress smoothly. The initial reaction speed of the silanol-generating reaction of the trialkoxysilyl group is very high as compared with an alkyldialkoxysilyl group or a dialkylalkoxysilyl group. Therefore, it is considered that with the curable composition of the present invention, an adequate strength property can be obtained in a short period of time, particularly the time for bonding is short.

Among trialkoxysilyl groups, a trialkoxysilyl group having alkoxy groups of smaller number of carbons is more preferred, since it has higher initial reaction speed of silanol-generating reaction than a trialkoxysilyl group having alkoxy groups of higher number of carbons. A trimethoxysilyl group and a triethoxysilyl group are more preferred, and a trimethoxysilyl group is most preferred, since it has a very high initial reaction speed of the silanol-generating reaction. Therefore, as the "hydrolyzable silicon group (E)", a trimethoxysilyl group is most preferred.

Further, the ratio of the hydrolyzable silicon group (E) to the hydrolyzable silicon groups of the formula (1) in the polyoxyalkylene polymer (A) depends on e.g. applications or properties required.

In the case where the polyoxyalkylene polymer (A) has only hydrolyzable silicon groups (E) as the hydrolyzable silicon groups, i.e. in the case where almost 100% (i.e. from 80 to 100%) of the hydrolyzable silicon groups of the formula (1) in the polyoxyalkylene polymer (A), is the hydrolyzable silicon groups (E), there is an effect that the curing speed is high, and a room temperature-setting composition which is particularly excellent in curing property for bonding, can be obtained. In this case, it is preferred that from 90 to 100%, particularly from 95 to 100% of the hydrolyzable silicon groups (E) of the formula (1) is the hydrolyzable silicon groups (E).

Further, in the case of coexisting the hydrolyzable silicon groups of the formula (1) wherein a is 1 or 2 and the hydrolyzable silicon groups (E), a room temperature-setting composition which may have both good elongation property and quick curing property can be obtained.

In this case, the ratio of the hydrolyzable silicon groups (E) to the total of the hydrolyzable silicon groups of the formula (1) in the polyoxyalkylene polymer (A)) is preferably from 5 to 80%. By changing the ratio optionally, the properties can be freely controlled depending on the requirements. Namely, when the ratio of the hydrolyzable silicon groups (E) is from 5 to 50%, the curing property improves, and further, good elongation property and flexibility required for e.g. a sealant, can be provided. And when the ratio of the hydrolyzable silicon groups (E) is from 50 to 80%, an adequate elongation property required for e.g. an elastic adhesive can be obtained, and curing property significantly improves.

Further, the hydrolyzable silicon groups of the formula (1) other than the hydrolyzable silicon groups (E) is particularly preferably the hydrolyzable silicon groups of the formula (1) wherein a is 2. A dialkoxyalkylsilyl group having a $C_{1-4}$ alkoxy group is particularly preferred. A dimethoxymethylsilyl group is most preferred.

A method to obtain a composition having both the hydrolyzable silicon groups of the formula (1) wherein a is 1 or 2 and the hydrolyzable silicon groups (E), includes the following method (V) or (VI), and it is possible to use both methods (V) and (VI).

(V) A polyoxyalkylene polymer having both the hydrolyzable silicon groups of the formula (1) wherein a is 1 or 2 and the hydrolyzable silicon groups (E) is used.

(VI) Both a polyoxyalkylene polymer having the hydrolyzable silicon groups of the formula (1) wherein a is 1 or 2 and a polyoxyalkylene polymer having the hydrolyzable silicon groups (E) are used.

The molecular weight of the polyoxyalkylene polymer of the present invention is suitably selected depending on the application to be used.

Namely, for a use for e.g. a sealant wherein flexibility is important, a polymer having a molecular weight calculated as the hydroxyl number of the polyoxyalkylene polymer having hydroxyl groups which is a material (hereinafter referred to as the molecular weight calculated as the hydroxyl number) of from 8000 to 50000 is suitable. The molecular weight calculated as the hydroxyl number is particularly preferably from 8000 to 25000, most preferably from 12000 to 20000.

Further, for a use such as an adhesive which requires strength, the molecular weight calculated as the hydroxyl number of from 8000 to 30000 is suitable. If it is less than 8000, the cured product is fragile, and if it is more than 30000, the work efficiency significantly deteriorates from high viscosity. The molecular weight calculated as the hydroxyl number is more preferably from 8000 to 20000, particularly preferably from 12000 to 20000.

Polymer (B) Made by Polymerization of a Polymerizable Unsaturated Group-Containing Monomer (C)

The room temperature-setting composition comprising, as an essential component, the above polyoxyalkylene polymer (A) of the present invention, is excellent in curing property. In the present invention, by using the polymer (B) made by polymerization of a polymerizable unsaturated group-containing monomer (C), in addition to the polyoxyalkylene polymer (A), an effect of giving the bonding property at the initial stage of the curing reaction can be obtained, i.e. the time for showing bonding strength is significantly shortened.

Namely, the present invention provides a room temperature-setting composition containing the polyoxyalkylene polymer (A) having a molecular weight of from 8000 to 50000 and having hydrolyzable silicon groups of the formula (1), which comprises, as essential components, the polyoxyalkylene polymer having a molecular weight of from 8000 to 15000 and having hydrolyzable silicon groups of the formula (1) wherein a is 3, and the polymer (B) made by polymerization of the polymerizable unsaturated group-containing monomer (C).

As a representative example of the polymerizable unsaturated group-containing monomer (C) includes a compound of the following formula (6), but it is not particularly limited.

$$CRR^5=CR^3R^4 \quad (6)$$

wherein each of R and $R^5$ is a hydrogen atom, a halogen atom or a monovalent organic group. As the organic group, $C_{1-10}$ substituted or unsubstituted monovalent hydrocarbon group is preferred. Each of R and $R^5$ is more preferably a hydrogen atom. Each of $R^3$ and $R^4$ which is independent from each other, is a hydrogen atom, a halogen atom or a monovalent organic group. The organic group is preferably a $C_{1-10}$ substituted or unsubstituted monovalent hydrocarbon group, an alkoxy group, a carboxyl group, an alkoxycarbonyl group, a cyano group, a cyano group-containing group, an alkenyl group, an acyloxy group, an amide group, a pyridyl group, a glycidyloxy group or a glycidyloxycarbonyl group. $R^3$ is particularly preferably a hydrogen atom, a halogen atom or a $C_{1-10}$ substituted or unsubstituted monovalent hydrocarbon group.

The polymerizable unsaturated group-containing monomer (C) may, for example, be a styrene monomer such as styrene, α-methylstyrene or chlorostyrene; an acryl monomer including acrylic acid, methacrylic acid or its ester such as acrylic acid, methacrylic acid, methylacrylate, methyl methacrylate, ethyl acrylate, ethyl methacrylate, butyl acrylate, butyl methacrylate, acrylic acid-2-ethylhexyl, methacrylic acid-2-ethylhexyl, benzyl acrylate or benzyl methacrylate, acrylamide or methacrylamide; a cyano group-containing monomer such as acrylonitrile or 2,4-dicyanobutene-1; a vinyl ester monomer such as vinyl acetate or vinyl propionate; a diene monomer such as butadiene, isoprene or chloroprene; a glycidyl group-containing monomer such as vinylglycidyl ether, allylglycidyl ether, methallylglycidyl ether, glycidyl acrylate or glycidyl methacrylate; another olefin, an unsaturated ester, an halogenated olefin or a vinyl ether.

The polymerizable unsaturated group-containing monomer (C) may be used alone or as a mixture of two or more of them. In the case where a cyano group-containing monomer, a glycidyl group-containing monomer or a styrene monomer is used, particularly acrylonitrile, glycidyl acrylate, glycidyl methacrylate or styrene is used, more excellent bonding property and mechanical property can be obtained, such being favorable. Further, in the case where rubber elasticity is required after bonding, it is preferred to use an acrylic acid ester.

As the polymerizable unsaturated group-containing monomer (C), a polymerizable monomer having hydrolyzable silicon groups of the formula (1) can be used. As such a polymerizable monomer having hydrolyzable silicon groups, a compound of the following formula (7) is particularly preferred.

$$R^7—SiY_b—R^6_{3-b} \quad (7)$$

wherein $R^7$ is a monovalent organic group having polymerizable unsaturated groups, $R^6$ is a $C_{1-20}$ substituted or unsubstituted monovalent organic group, Y is a hydroxyl group or a hydrolyzable group, b is 1, 2 or 3, provided that when more than one $R^6$ exist, the plurality of $R^6$ may be the same or different, and when more than one Y exist, the plurality of Y may be the same or different.

As the polymerizable monomer having hydrolyzable silicon groups, a vinyl monomer having hydrolyzable silicon groups or an acryl monomer having hydrolyzable silicon groups may, for example, be mentioned. Specific examples are mentioned hereinafter, and 3-acryloyloxypropyl trimethoxysilane and 3-methacryloyloxypropyl trimethoxysilane are particularly preferred.

A vinylsilane such as vinylmethyl dimethoxysilane, vinylmethyl diethoxysilane, vinylmethyl dichlorosilane, vinyl trimethoxysilane, vinyl triethoxysilane, vinyl trichlorosilane or tris(2-methoxyethoxy)vinylsilane, an acryloyloxysilane or a methacryloyloxysilane such as 3-acryloyloxypropyl methyldimethoxysilane, 3-methacryloyloxopropyl methyldimethoxysilane, 3-acryloyloxypropyl trimethoxysilane or 3-methacryloyloxypropyl trimethoxysilane and the like.

In addition, for example, a polysiloxane compound having from 2 to 30 of silicon atoms, and having both a carbon-carbon double bond and a silicon atom bonded to a hydrolyzable group can be used as the polymerizable monomer having hydrolyzable silicon groups.

The polymerizable monomer having hydrolyzable silicon groups can be used alone or as the mixture of two or more of them.

In the case of using a polymerizable monomer having hydrolyzable silicon groups, it is preferred to use from 0.01 to 20 parts by weight of the polymer based on 100 parts by weight of the polymerizable unsaturated group-containing monomer (C).

Polymer Composition

In the case of using both the polymer (A) and the polymer (B), the polymer composition made of the polymer (A) and the polymer (B) can be made by the following methods (VII) to (XI).

(VII) A method of mixing the polyoxyalkylene polymer (A) with the polymer (B) made by preliminarily polymerizing the polymerizable unsaturated group-containing monomer (C).

(VIII) A method of polymerizing the polymerizable unsaturated group-containing monomer (C) in the polyoxyalkylene polymer (A).

(IX) A method of polymerizing the polymerizable unsaturated group-containing monomer (C) in a polyoxyalkylene polymer (D) having unsaturated groups, then converting remaining unsaturated groups in the polymer (D) to the hydrolyzable silicon groups of the formula (1). The preferred converting method is reacting hydrosilyl compounds of the formula (3) with the unsaturated groups.

(X) A method of polymerizing the polymerizable unsaturated group-containing monomer (C) in the precursor of the polyoxyalkylene polymer (A), then converting the precursor to the polyoxyalkylene polymer (A).

(XI) A method of polymerizing the polymerizable unsaturated group-containing monomer (C) in the presence of a solvent or a diluent, followed by mixing with the polyoxyalkylene polymer (A), and if necessary, removing the solvent or the diluent.

The solvent may be suitably selected depending on the kind of the polymerizable unsaturated group-containing monomer (C). As the diluent, an unsaturated group-containing polyoxyalkylene polymer is preferred. The polyoxyalkylene polymer (D) having unsaturated groups may exist in the solvent or the diluent during polymerization.

For the polymerization of the polymerizable unsaturated group-containing monomer (C), a polymerization initiator such as a radical generator may be used. It is possible to carry out the polymerization by radiation or heating without using a polymerization initiator, as the case requires. As the polymerization initiator, for example, a polymerization initiator such as a peroxide type, an azo type or a redox type or a metal compound catalyst may be mentioned. As the polymerization initiator, specifically, 2,2'-azobisisobutyronitrle, 2,2'-azobis-2-methylbutyronitrile, benzoyl peroxide, t-alkylperoxyester, acetyl peroxide or diisopropyl peroxycarbonate may, for example, be mentioned. Further, the above polymerization reaction is conducted preferably at a temperature of from 20° C. to 200° C., particularly preferably at a temperature of from 50° C. to 150° C. for from several hours to several tens hours.

In the case of using the polymer (B) of the present invention, preferably the polymer (B) is used so that the weight ratio of the polymer (A)/the polymer (B) is within a range of from 100/1 to 1/300. It is particularly preferably within a range of from 100/1 to 1/100, more preferably from 100/1 to 1/10, in view of e.g. work efficiency.

The polymer (B) may be dispersed uniformly in a form of fine particles, or may be dissolved uniformly in the polyoxyalkylene polymer (A). The polymer (B) is preferably dispersed uniformly in a form of fine particles, considering the viscosity of the composition or work efficiency.

Room Temperature-Setting Composition

The room temperature-setting composition of the present invention may contain the following additive. Now, the additive will be described.

Filler

As the filler, a known filler may be used, the amount of filler used is preferably from 0 to 1000 wt %, particularly preferably from 50 to 250 parts by weight, based on 100 parts by weight of the polymer (A) or the total of the polymer (A) and the polymer (B). Specific examples of the filler are mentioned hereinafter. Such a filler may be used alone or as the mixture of two or more of them.

A powder filler including a calcium carbonate such as a calcium carbonate having its surface been subjected to surface treatment with a fatty acid or a resin acid organic matter, a colloidal calcium carbonate having an average particle size of at most 1 $\mu$m, which is made by further pulverizing said calcium carbonate, precipitated calcium carbonate light having an average particle size of from 1 to 3 $\mu$m, which is made by a sedimentation method, or a heavy calcium carbonate having an average particle size of from 1 to 20 $\mu$m, fume silica, a precipitated silica, silic anhydride, silicon hydrate or carbon black, magnesium carbonate, diatomaceous earth, burned clay, clay, talc, titanium oxide, bentonite, organic bentonite, ferric oxide, zinc oxide, active zinc flower, silasbaloon, wood flour, pulp, arboreous cotton chip, mica, walnut hull, chaff, graphite, aluminum fine powder or flint powder. Fiber fillers including asbestos, a glass fiber, a glass filament, a carbon fiber, a Kevler fiber, a polyethylene fiber.

Plasticizer

As the plasticizer, a known plasticizer may be used. The amount of plasticizer to be used is preferably from 0 to 100 parts by weight, based on 100 parts by weight of the polymer (A) or the total of the polymer (A) and the polymer (B). Specific examples of the plasticizer are mentioned hereinafter.

A phthalic acid ester such as dioctyl phthalate, dibutyl phthalate or butylbenzyl phthalate. An aliphatic carboxylic acid ester such as dioctyl adipate, diisodecyl succinate, dibutyl sebacate or butyl oleate. An alcohol ester such as pentaerythritol ester. An ester phosphate such as trioctyl phosphate or tricresyl phosphate. An epoxy plasticizer such as epoxylated soybean oil, 4,5-eopxyhexahydrophthalic acid dioctyl or benzylepoxystearic acid. A chlorinated paraffin. A polyester plasticizer such as a polyester made by reacting a dibasic acid and a bivalent alcohol. A high molecular weight plasticizer including a polyether such as polyoxypropylene glycol or its derivative, a polystyrene oligomer such as poly-α-methylstyrene or polystyrene, an oligomer such as polybutadiene, butadiene-acrylonitrile copolymer, polychloroprene, polyisoprene, polybutene, hydrogenated polybutene or epoxylated polybutadiene.

Curing Accelerating Catalyst

When curing of the curable composition of the present invention is carried out, a curing accelerating catalyst which accelerates the curing reaction of the hydrolyzable group-containing silicon groups may be used. Specific examples include the following compounds. They are used alone or as the mixture of two or more of them. It is preferred to use from 0 to 10 parts by weight of the curing accelerating catalyst, based on 100 parts by weight of the polymer (A) or the total of the polymer (A) and the polymer (B).

A metal salt such as an alkyl titanate, an organic silicon titanate or bismuthtris-2-ethylhexoate, an acid compound such as phosphoric acid, p-toluenesulfonic acid or phthalic acid, an aliphatic monoamine such as butylamine, hexylamine, octylamine, decylamine or laurylamine, an aliphatic diamine such as ethylenediamine or hexanediamine, an aliphatic polyamine such as diethylenetriamine, triethylenetetramine or tetraethylenepentamine, a heterocyclic amine such as piperidine or piperazine, an aromatic amine such as methaphenylenediamine, an ethanolamine, an amine compound such as triethylamine or various modified amines which are used as a curing agent of epoxy resins.

A mixture of the above amine and a bivalent tin compound such as tin 2-ethylhexanoate, tin naphthenate or tin stearate.

Dibutyl tin diacetate, dibutyl tin dilaurate, dioctyl tin dilaurate or following carboxylic acid organic tin compounds, or a mixture of such a carboxylic acid organic tin compound and the above amine.

$(n-C_4H_9)_2Sn(OCOCH=CHCOOCH_3)_2$,
$(n-C_4H_9)_2Sn(OCOCH=CHCOOC_4H_9-n)_2$, (n—$C_8H_{17}$)$_2$Sn(OCOCH=CHCOOCH$_3$)$_2$,
(n—$C_8H_{17}$)$_2$Sn(OCOCH=CHCOO$C_4H_9$—n)$_2$,
(n—$C_8H_{17}$)$_2$Sn(OCOCH=CHCOO$C_8H_{17}$—iso)$_2$.

The following sulfur-containing organic tin compounds:
(n—$C_4H_9$)$_2$Sn(SCH$_2$COO),
(n—$C_8H_{17}$)$_2$Sn(SCH$_2$COO),
(n—$C_8H_{17}$)$_2$Sn(SCH$_2$CH$_2$COO),
(n—$C_8H_{17}$)$_2$Sn(SCH$_2$COOCH$_2$CH$_2$OCOCH$_2$S),
(n—$C_4H_9$)$_2$Sn(SCH$_2$COO$C_8H_{17}$—iso)$_2$,
(n—$C_8H_{17}$)$_2$Sn(SCH$_2$COO$C_8H_{17}$—iso)$_2$,
(n—$C_8H_{17}$)$_2$Sn(SCH$_2$COO$C_8H_{17}$—n)$_2$,
(n—$C_4H_9$)$_2$SnS.

An organic tin oxide such as (n—$C_4H_9$)$_2$SnO or (n—$C_8H_{17}$)$_2$SnO, and a reaction product of such an organic tin oxide and an ester compound. As the ester compound, ethyl silicate, dimethyl maleate, diethyl maleate, dioctyl maleate, dimethyl phthalate, diethyl phthalate or dioctyl phthalate may, for example, be mentioned.

The following chelate tin compounds and a reaction product of such a tin compound and alkoxysilane ("acac" means an acetylacetonato ligand).
(n—$C_4H_9$)$_2$Sn(acac)$_2$,
(n—$C_8H_{17}$)$_2$Sn(acac)$_2$,
(n—$C_4H_9$)$_2$ ($C_8H_{17}$O)Sn(acac).

The following tin compounds:
(n—$C_4H_9$)$_2$(CH$_3$COO)SnOSn(OCOCH$_3$) ($C_4H_9$—n)$_2$,
(n—$C_4H_9$)$_2$(CH$_3$O)SnOSn(OCH$_3$) ($C_4H_9$—n)$_2$.

Bonding Property Giving Agent

In order to improve the bonding property, an bonding property giving agent is used. As the bonding property giving agent, a silane coupling agent such as (meth)acryloyloxy group-containing silane, an amino group-containing silane, a mercapto group-containing silane, an epoxy group-containing silane or a carboxyl group-containing silane may, for example, be mentioned.

As a (meth)acryloyloxy group-containing silane, 3-methacryloyloxypropyl trimethoxysilane, 3-acryloyloxypropyl trimethoxysilane or 3-methacryloyloxypropyl methyldimethoxysilane may, for example, be mentioned.

An amino group-containing silane, 3-aminopropyl trimethoxysilane, 3-aminopropyl triethoxysilane, 3-aminopropyl methyldimethoxysilane, N-(2-aminoethyl)-3-aminopropyl trimethoxysilane, N-(2-aminoethyl)-3-aminopropyl methyldimethoxysilane, N-(2-aminoethyl)-3-aminopropyl triethoxysilane, 3-ureidopropyl triethoxysilane, N-(N-vinylbenzyl-2-aminoethyl)-3-aminopropyl trimethoxysilane or 3-anilinopropyl trimethoxysilane may, for example, be mentioned.

As the mercapto group-containing silane, 3-mercaptopropyl trimethoxysilane, 3-mercaptopropyl triethoxysilane, 3-mercaptopropyl methyldimethoxysilane or 3-mercaptopropyl methyldiethoxysilane may, for example, be mentioned.

As the epoxy group-containing silane, 3-glycidyloxypropyl trimethoxysilane, 3-glycidyloxypropyl methyldimethoxysilane or 3-glycidyloxypropyl triethoxysilane may, for example, be mentioned.

As the carboxyl group-containing silane, 2-carboxyethyl triethoxysilane, 2-carboxyethylphenylbis(2-methoxyethoxy)silane or N-(N-carboxylmethyl-2-aminoethyl)-3-aminopropyl trimethoxysilane may, for example, be mentioned.

Further, it is possible to use a reaction product obtained by reacting at least two silane coupling agents. As an example of a reaction product, a reaction product of an amino group-containing silane and an epoxy group-containing silane, a reaction product of an amino group-containing silane and a (meth)acryloyloxy group-containing silane, a reaction product of an epoxy group-containing silane and a mercapto group-containing silane or a reaction product of mercapto group-containing silanes. Such a reaction product can be easily obtained by mixing the silane coupling agents, followed by stirring for from 1 to 8 hours within a temperature of from room temperature to 150° C.

The above compounds may be used alone or as a mixture of two or more of them. The amount of the silane coupling agent to be used is preferably from 0 to 30 parts by weight, based on 100 parts by weight of the polymer (A) or the total of the polymer (A) and the polymer (B).

As the bonding property giving agent, an epoxy resin may be added. Further, as the case requires, a epoxy resin curing agent may also be used. As the epoxy resin which may be added to the composition of the present invention, general epoxy resin may be mentioned. Specifically, the following resins may be mentioned. The amount is preferably from 0 to 100 parts by weight, based on 100 parts by weight of the polymer (A) or the total of the polymer (A) and the polymer (B).

A bisphenol A-diglycidyl ether type epoxy resin, a bisphenol F-diglycidyl ether type epoxy resin, a fire-resistant type epoxy resin such as a tetrabromobisphenol A-glycidyl ether type epoxy resin, a novolak type epoxy resin, a hydrogenated bisphenol A type epoxy resin, a glycidyl ether type epoxy resin of a bisphenol A/propylene oxide adduct, a diglycidyl ester type epoxy resin such as glycidyl 4-glycidyloxybenzoate, diglycidyl phthalate, diglycidyl tetrahydrophthalate or diglycidyl hexahydrophthalate, an m-aminophenol type epoxy resin, a diaminodiphenylmethane type epoxy resin, an urethane modified epoxy resin, various alicyclic epoxy resins, a glycidyl ether of polyvalent alcohol such as N,N-diglycidylaniline, N,N-diglycidyl-o-toluidine, triglycidyl isocyanurate, polyalkylene glycol diglycidyl ether or glycerol, a hydantoin type epoxy resin, a vinyl type polymer containing an epoxy resin or an epoxy group which are generally used, including an epoxy compound of an unsaturated polymer such as a petroleum resin.

Further, a curing agent (or a curing catalyst) of the above epoxy resin may be used for the composition of the present invention. As such a curing agent, a curing agent for epoxy resins which is generally used, may be mentioned. Specifically, the following curing agents may be mentioned. The amount is preferably from 0.1 to 300 parts by weight to the epoxy resin.

An amine or its salt such as triethylenetetramine, tetraethylenepentamine, diethylaminopropylamine, N-aminoethylpiperazine, m-xylylenediamine, m-phenylenediamine, diaminodiphenylmethane, diaminodiphenylsulfone, isophoronediamine or 2,4,6-tris(dimethylaminomethyl)phenol, or a blocked amine such as a ketimine compound, a polyamide resin, an imidazole, a dicyandiamide, a boron trifluoride complex compound, a carboxylic anhydride such as phthalic anhydride, hexahydrophthalic anhydride, tetrahydrophthalic anhydride, dodecenyl succinic anhydride or pyromellitic anhydride, a phenoxy resin, a polyalkylene oxide type polymer having an average of at least one group capable of reacting with an epoxy group per molecule, such as a carboxylic acid or an alcohol, including terminal aminated polyoxypropylene glycol or terminal carboxylated polyoxypropylene glycol, a liquid terminal functional group-containing polymer including a polybutadiene having its terminal modified with e.g. a hydroxyl group, a carboxylic group or an amino group, a hydrogenated polybutadiene or an acrylonitrile-butadiene copolymer. A ketimine compound can also be used.

Solvent

Further, in the case of using the composition of the present invention as a curable composition, a solvent may be added in order to adjust the viscosity and improve the storage-stability of the composition. The amount of the solvent is preferably from 0 to 500 parts by weight, based on 100 parts by weight of the polymer (A) or the total of the polymer (A) and the polymer (B).

As the solvent, an aliphatic hydrocarbon, an aromatic hydrocarbon, a halogenated hydrocarbon, an alcohol, a ketone, an ester, an ether, an ester alcohol, a ketone alcohol, a ether alcohol, a ketone ether, a ketone ester or an ester ether may be used. Among these, an alcohol is preferred. When preserving the composition of the present invention for a long period of time, it is preferred to use an alcohol, since the storage-stability improves. As an alcohol, a $C_{1-10}$ alkyl alcohol is preferred, and methanol, ethanol, isopropanol, isoamyl alcohol or hexyl alcohol is particularly preferred.

Dehydrating Agent

In order to further improve the storage-stability of the curable composition of the present invention, a small amount of a dehydrating agent may be added within a range of not impairing the curing property or flexibility. The amount of the dehydrating agent is preferably from 0 to 30 parts by weight, based on 100 parts by weight of the polymer (A) or the total of the polymer (A) and the polymer (B).

Specifically, an alkyl orthoformate such as methyl orthoformate or ethyl orthoformate, an alkyl orthoacetate such as methyl orthoacetate or ethyl orthoacetate, a hydrolyzable organic silicon compound such as methyl trimethoxysilane, vinyl trimethoxysilane, tetramethoxysilane or tetraethoxysilane, or a hydrolyzable organic titanium compound may be used. Vinyl trimethoxysilane or tetraethoxysilane is particularly preferred in view of the cost and efficiency.

Thixo Property Giving Agent

In order to improving the flowing property, a thixo property giving agent may be used. As such a thixo property giving agent, hydrogenated castor oil or a fatty acid amide may be used.

Age Resistor

Further, as an age resistor, an antioxidant, an ultraviolet absorbent or a light stabilizer which are generally used, may be suitably used. Compounds of hindered amine, benzotriazole, benzophenone, benzoate, cyanoacrylate, acrylate, hindered phenol, phosphorus and sulfur may be suitably used.

The Others

In order to improve the adhesion or the surface tack of the coating material for a long period of time, an air oxidation-curable compound or a photo-curable compound may be added. The amount of the air oxidation-curable compound is preferably from 0 to 50 parts by weight, based on 100 parts by weight of the polymer (A) or the total of the polymer (A) and the polymer (B) and the amount of the photo-curable compound is preferably from 0 to 50 parts by weight, based on 100 parts by weight of the polymer (A) or the total of the polymer (A) and the polymer (B).

As such an air oxidation-curable compound, a drying oil such as tung oil or linseed oil, various alkyd resins obtained by modifying such a compound, an acryl polymer modified by a drying oil, a silicon resin, a diene polymer such as polybutadiene, a polymer or a copolymer of a $C_{5-8}$ diene, further, various modified products of the polymer or the copolymer, such as a maleated modified product or a boiled oil modified product, may be mentioned. As a photo-curable compound, a polyfunctional acrylate is usually used.

EXAMPLES

Now, the present invention will be described in further detail with reference to Working Examples and Comparative Examples. Working Examples and Comparative Examples are shown in hereinafter, wherein the composition is made by using each polymer P1 to P11 produced in each Production Example (Examples 1 to 11) and each polymer composition Q1 to Q16 produced in each Production Example (Examples 12 to 27). The molecular weight is calculated as a hydroxyl number. The $M_w/M_n$ is a value measured by gel permeation chromatography by using tetrahydrofuran as a solvent.

Example 1

Glycerol, as an initiator, was reacted with propylene oxide in the presence of zinc hexacyano cobaltate-glyme complex catalyst. A methanol solution of sodium methoxide were added to propylene oxide having a molecular weight of 17000 and a $M_w/M_n$ of 1.3, methanol was distilled while heating under reduced pressure, and the terminal hydroxyl groups of polypropylene oxide were converted to a sodium alkoxide. Then allyl chloride was reacted therewith. Unreacted allyl chloride was removed, followed by purification, and allyl group terminated polypropylene oxide (polymer $U_1$) was obtained. To the polymer $U_1$, trimethoxysilane which is a hydrosilyl compound was reacted in the presence of a platinum catalyst, and a polymer P1 having trimethoxysilyl groups was obtained.

Example 2

Using polypropylene oxide having a molecular weight of 17000 and a $M_w/M_n$ of 1.3, obtained by reacting propylene glycol as the initiator, with propylene oxide in the presence of a zinc hexacyanocobaltate-glyme complex catalyst, the same operation as in Example 1 was carried out to obtain polypropylene oxide having allyl groups at the terminals. To the reaction product, trimethoxysilane which is a hydrosilyl compound was reacted in the presence of a platinum catalyst, and a polymer P2 having trimethoxysilyl groups was obtained.

Example 3

Using a polypropylene oxide having a molecular weight of 15000 and a $M_w/M_n$ of 1.3, obtained by reacting sorbitol as the initiator, with propylene oxide in the presence of a zinc hexacyanocobaltate-glyme complex catalyst, the same operation as in Example 1 was carried out to obtain a polypropylene oxide having allyl groups at the terminals. To the reaction product, trimethoxysilane which is a hydrosilyl compound, was reacted in the presence of a platinum catalyst to obtain a polymer P3 having trimethoxysilyl groups.

Example 4

Using a polypropylene oxide having a molecular weight of 17000 and a $M_w/M_n$ of 1.3, obtained by reacting glycerol as the initiator, with propylene oxide in the presence of a zinc hexacyanocobaltate-glyme complex catalyst, the same operation as in Example 1 was carried out to obtain a polypropylene oxide having allyl groups at the terminals. To the reaction product, a mixture having methyl dimethoxysilane and trimethoxysilane, which are hydrosilyl compounds, mixed at a molar ratio of 30 to 70, was reacted in the presence of a platinum catalyst to obtain a polymer P4 having both methyl dimethoxysilyl group and trimethoxysilyl group in a molecule.

Example 5

Using a polypropylene oxide having a molecular weight of 17000 and a $M_w/M_n$ of 1.3, obtained by reacting glycerol as the initiator, with propylene oxide in the presence of a zinc hexacyanocobaltate-glyme complex catalyst, the same operation as in Example 1 was carried out to obtain a polypropylene oxide having allyl groups at the terminals. To the reaction product, 3-mercaptopropyl trimethoxysilane which is a silyl compound, was reacted, by using 2,2'-azobis-2-methylbutyronitrile as the initiator, to obtain a polymer P5 having trimethoxysilyl groups.

Example 6

Using glycerol as the initiator, polymerization of polypropylene oxide was conducted by a zinc hexacyanocobaltate-glyme catalyst to obtain a polyoxypropylene triol having a molecular weight of 17000 and a $M_w/M_n$ of 1.3, followed by purification. Isocyanate propyl trimethoxysilane was added thereto, and urethanating reaction was conducted to convert both terminals to the trimethoxysilyl groups, and a polymer P6 having a molecular weight of 18000 was obtained.

Example 7

Using a polypropylene oxide having a molecular weight of 17000 and a $M_w/M_n$ of 1.3, obtained by reacting glycerol as the initiator, with propylene oxide in the presence of a zinc hexacyanocobaltate-glyme complex catalyst, the same operation as in Example 1 was carried out to obtain a polypropylene oxide having allyl groups at the terminals. To the reaction product, methyldimethoxysilane which is a hydrosilyl compound, was reacted in the presence of a platinum catalyst to obtain a polymer P7 having methyldimethoxysilyl groups.

Example 8

Using a polypropylene oxide having a molecular weight of 7000 and a $M_w/M_n$ of 1.2, obtained by reacting propylene glycol as the initiator, with propylene oxide in the presence of a zinc hexacyanocobaltate-glyme complex catalyst, the same operation as in Example 1 was carried out to obtain a polypropylene oxide having allyl groups at the terminals. To the reaction product, methyldimethoxysilane which is a hydrosilyl compound, was reacted in the presence of a platinum catalyst to obtain a polymer P8 having methyldimethoxysilyl groups.

Example 9

Using a polypropylene oxide having a molecular weight of 7000 and a $M_w/M_n$ of 1.2, obtained by reacting propylene glycol as the initiator, with propylene oxide in the presence of a zinc hexacyanocobaltate-glyme complex catalyst, the same operation as in Example 1 was carried out to obtain a polypropylene oxide having allyl groups at the terminals. To the reaction product, trimethoxysilane which is a hydrosilyl compound, was reacted in the presence of a platinum catalyst to obtain a polymer P9 having trimethoxysilyl groups.

EXAMPLE 10

A methanol solution of sodium methoxide was added to a polyoxypropylene diol having an average molecular weight of 3000, obtained by using potassium hydroxide catalyst, and methanol was removed while heating under reduced pressure to convert the terminal hydroxyl groups to sodium alkoxide. The mixture was reacted with chlorobromomethane to conduct macromolecularization, and allyl chloride was reacted therewith to obtain a polypropylene oxide having allyloxy groups at the terminals ($M_w/M_n$ 1.9). Trimethoxysilane which is a hydrosilyl compound, was reacted therewith in the presence of a platinum catalyst to obtain a polymer P10 having a molecular weight of 7000 and having trimethoxysilyl groups at the terminals.

Example 11

Using a polyoxypropylene diol having an average molecular weight of 6000 ($M_w/M_n$ 1.9), obtained by using potassium hydroxide catalyst, the same operation as in Example 1 was carried out to obtain a polyoxypropylene having allyloxy groups at the terminals. Trimethoxysilane which is a hydrosilyl compound, was reacted therewith in the presence of a platinum catalyst, to obtain a polymer P11 having trimethoxysilyl groups at the terminals.

Examples 12 to 22

50 g from 70 g of the polymer P1 was put in a four neck distillation flask of 300 cm³. While keeping at a temperature of 110° C., a mixture comprising 20 g of the rest of the polymer P1, 15 g of styrene, 15 g of acrylonitrile and 0.6 g of azobisisobutyronitrile, was dropwise added thereto under nitrogen atmosphere while stirring over a period of 2 hours. Then the stirring was kept for half an hour at the same temperature. After the reaction was finished, an unreacted monomer was removed by heating and deairing under reduced pressure at a temperature of 110° C. under 0.1 mmHg for 2 hours, and a polymer Q1 was obtained. The same operations were carried out except that the polymers were used instead of the polymer P1, a polymer Q2 (Example 13), a polymer Q3 (Example 14), a polymer Q4 (Example 15), a polymer Q5 (Example 16), a polymer Q6 (Example 17), a polymer Q7 (Example 18), a polymer Q8 (Example 19), a polymer Q9 (Example 20), a polymer Q10 (example 21) and a polymer Q11 (Example 22) were obtained from the polymer P2, the polymer P3, the polymer P4, the polymer P5, the polymer P6, the polymer P7, the polymer P8, the polymer P9, the polymer P10 and the polymer P11 were obtained, respectively.

Example 23

10 g of the polymer U1 was dissolved in 25 g of toluene, and put in a four neck distillation flask of 300 cm³. While keeping at a temperature of 100° C., a mixture comprising 15 g of styrene, 15 g of acrylonitrile and 0.6 g of azobisisobutyronitrile was dropwise added thereto under nitrogen atmosphere while stirring over a period of 2 hours. Then the stirring was kept for half an hour at the same temperature. After the reaction was finished, 60 g of the polymer P1 was added, followed by stirring and mixing. Toluene and an unreacted monomer were removed by heat decomposition deairing while stirring at a temperature of 110° C. under 0.1 mmHg for 2 hours, and the polymer Q12 was obtained.

Examples 24 to 25

50 g from 70 g of the polymer P1 was put in a four neck distillation flask of 300 cm³. While keeping at a temperature of 110° C., a mixture comprising 20 g of the rest of the polymer P1, 21 g of glycidyl methacrylate, 9 g of acrylonitrile and 0.6 g of azobisisobutyronitrile, was dropwise added thereto under nitrogen atmosphere while stirring over a period of 2 hours. Then the stirring was kept for half an hour at the same temperature. After the reaction was finished, an unreacted monomer was removed by heat decomposition deairing at a temperature of 110° C. under 0.1 mmHg for 2 hours, and the polymer Q13 was obtained.

The same operation was carried out except that the polymer P1 was changed to the polymer P7, and the polymer Q14 was obtained (Example 25).

Examples 26 to 27

50 g from 70 g of the polymer P1 was put in a four neck distillation flask of 300 cm³. While keeping at a temperature of 110° C., a mixture comprising 20 g of the rest of the polymer P1, 5 g of 3-methacryloyloxypropyl trimethoxysilane, 25 g of acrylonitrile and 0.6 g of azobisisobutyronitrile, was dropwise added thereto under nitrogen atmosphere while stirring over a period of 2 hours. Then the stirring was kept for half an hour at the same temperature. After the reaction was finished, an unreacted monomer was removed by heat decomposition deairing at a temperature of 110° C. under 0.1 mmHg for 2 hours, and a polymer Q15 was obtained.

The same operation was carried out except that the polymer P1 was changed to the polymer P7, and the polymer Q16 was obtained (Example 27).

Examples 28 to 40

To 100 parts by weight of each polymer shown in the Tables among polymers P1 to P11 and Q1, 120 parts by weight of calcium carbonate as an additive, 50 parts by weight of a phthalic acid ester plasticizer, 3 parts by weight of the thixo property giving agent, 4 parts by weight of a mixture having tin 2-ethylhexanoate and dodecylamine at a ratio of 3 to 1 as a curing catalyst, and 1 part by weight of a phenol antioxidant as an additive were added, followed by mixing to make them uniform, and a composition was obtained.

Using the composition, the surface tack free time (unit: hour) was measured, which is a measure of work efficiency. The surface tack free time was measured at a temperature of 20° C. under a humidity of 65%, according to JIS A5758. In Example 32, as a polymer, 100 parts by weight of a mixture having P1 and P7 at a weight ratio of 7 to 3 was used.

Then, the time (unit: hrs) until the viscosity of the cured product reaches 1600000 cP, was measured, which is an index of the internal curing property. Namely, the same composition was put into a container having a depth of 6 cm, and curing was carried out at a temperature of 20° C. under a humidity of 65%, and time until the viscosity reaches 1600000 cP, was measured. To measure the viscosity, VISCOMETER B8U type viscosity meter, rotor No. 6 produced by Tokimec was used.

Further, using the same composition, H type specimen was prepared according to JISA 5758, and 50% modulus (unit: kg/cm$^2$) was measured. The results are shown in the Tables.

Examples 28 to 34 and 40 are Working Examples, and Examples 35 to 39 are Comparative Examples.

TABLE 1

| Examples | 28 | 29 | 30 | 31 | 32 | 33 |
|---|---|---|---|---|---|---|
| Polymer | P1 | P2 | P3 | P4 | P1/P7 = 7/3 | P5 |
| Surface tack free time | 1.1 | 1.3 | 0.5 | 1.6 | 1.4 | 1.0 |
| Time until the viscosity reaches 1600000 cP | 0.9 | 1.5 | 0.5 | 2.0 | 1.8 | 1.1 |
| 50% Modulus | 1.5 | 0.9 | 4.6 | 1.4 | 1.2 | 1.7 |

TABLE 2

| Examples | 34 | 35 | 36 | 37 | 38 | 39 | 40 |
|---|---|---|---|---|---|---|---|
| Polymer | P6 | P7 | P8 | P9 | P10 | P11 | Q1 |
| Surface tack free time | 1.2 | 2.9 | 4.3 | 1.8 | 2.0 | 1.8 | 1.2 |
| Time until the viscosity reaches 1600000 cP | 1.2 | 3.8 | 1.9 | 2.6 | 2.9 | 2.5 | 0.8 |
| 50% Modulus | 1.9 | 1.4 | 1.1 | 1.3 | 1.9 | 2.8 | 3.6 |

Examples 41 to 58

To 100 parts by weight of each polymer shown in the Tables among the polymers Q1 to Q16, 2 parts by weight of dibutyl tin dilaurate was added, followed by mixing well to obtain a composition. The results of bonding property test using these compositions are shown in the Tables. In Example 45, as a polymer, 100 parts by weight of a mixture having P1 and P7 at a weight ratio of 7 to 3 was used.

Examples 41 to 47, 53, 54 to 55 and 57 are Working Examples and Examples 48 to 52, 56 and 58 are Comparative Examples.

Tests in Bonding Property

The surfaces to be bonded of two aluminum plates having a length of 300 mm, a width of 25 mm and a thickness of 0.15 mm were wiped with a solvent. The composition was coated on both sides of the aluminum plates to have a thickness of 0.5 mm, and both surfaces were bonded each other, followed by press-bonding by a roller of 5 kg. After conducting a curing for one day and 7 days at a temperature of 20° C., and further seven days at a temperature of 50° C., T-type peeling strength was measured according to JIS K6854, at a pulling rate of 200 mm/min.

TABLE 3

| Examples | 41 | 42 | 43 | 44 | 45 | 46 |
|---|---|---|---|---|---|---|
| Polymer | Q1 | Q2 | Q3 | Q4 | Q1/Q7 = 7/3 | Q5 |
| T-type peeling strength (kg/25 mm) | | | | | | |
| 20° C. × 1 day | 2.4 | 2.1 | 2.8 | 2.0 | 1.9 | 1.9 |
| 20° C. × 7 days | 4.9 | 5.0 | 4.9 | 3.5 | 2.9 | 4.4 |
| 20° C. × 7 days + 50° C. × 7 days | 5.1 | 5.2 | 5.0 | 4.9 | 4.7 | 4.8 |

TABLE 4

| | 47 | 48 | 49 | 50 | 51 | 52 | 53 |
|---|---|---|---|---|---|---|---|
| Polymer | Q6 | Q7 | Q8 | Q9 | Q10 | Q11 | P1 |
| T-type peeling strength (kg/25 mm) | | | | | | | |
| 20° C. × 1 day | 2.0 | 0.2 | — | 1.4 | 1.1 | 0.9 | 1.4 |
| 20° C. × 7 days | 4.6 | 2.3 | 1.8 | 3.0 | 2.7 | 1.7 | 4.7 |
| 20° C. × 7 days + 50° × 7 days | 4.9 | 3.9 | 3.5 | 3.3 | 3.0 | 2.9 | 5.2 |

TABLE 5

| Examples | 54 | 55 | 56 | 57 | 58 |
|---|---|---|---|---|---|
| Polymer | Q12 | Q13 | Q14 | Q15 | Q16 |
| T-type peeling strength (kg/25 mm) | | | | | |
| 20° C. × 1 day | 2.0 | 3.5 | 0.5 | 3.9 | 0.9 |
| 20° C. × 7 days | 4.2 | 5.9 | 3.8 | 6.4 | 4.5 |
| 20° C. × 7 days + 50° C. × 7 days | 4.5 | 6.0 | 5.3 | 6.3 | 6.4 |

Example 59 (Working Example)

To 100 parts by weight of the polymer P1, 100 parts by weight of colloidal calcium carbonate having a particle size of 0.1 µm, 20 parts by weight of heavy calcium carbonate having a particle size of 2 µm, 20 parts by weight of rutile titanium oxide, 50 parts by weight of phthalic acid ester plasticizer, 5 parts by weight of fatty acid amide thixo property giving agent, 1 part by weight of benzotriazole ultraviolet absorbent, 1 part by weight of hindered phenol antioxidant and 1 part by weight of hindered amine light stabilizer were added, followed by heat dehydration while kneading. Then, 3 parts by weight of vinyl trimethoxysilane, 1 part by weight of N-(2-aminoethyl)-3-aminopropyl trimethoxysilane and 0.5 part by weight of 3-glycidyloxypropyl trimethoxysilane were added thereto, and the mixture was kneaded under nitrogen atmosphere. Two parts by weight of acetylacetonato tin catalyst were added thereto and the mixture was further kneaded to obtain a uniform mixture.

The surface tack free time was measured in the same manner as in Example 28 and found to be 0.3 hour. And the time until the viscosity of the cured product reaches 1600000 cP, was measured and found to be 0.5 hour. Further, 50% modulus was measured and found to be 5 kg/cm$^2$.

Example 60 (Working Example)

To 100 parts by weight of the polymer P1, 120 parts by weight of colloidal calcium carbonate having a particle size of 0.1 μm, 20 parts by weight of heavy calcium carbonate having a particle size of 2 μm, 50 parts by weight of a phthalic acid ester plasticizer, 5 parts by weight of bisphenol A-diglycidyl ether type epoxy resin, 3 parts by weight of a hydrogenated castor oil thixo property giving agent, 3 parts by weight of an acrylic acid ester photo-curable resin, 3 parts by weight of an aliphatic epoxy plasticizer, 3 parts by weight of a drying oil, 1 part by weight of a benzotriazole ultraviolet absorbent, 1 part by weight of a hindered phenol antioxidant, 1 part by weight of a hindered amine light stabilizer and 3 parts by weight of phenoxytrimethylsilane were added, and the mixture was kneaded under nitrogen atmosphere to obtain a main agent composition.

On the other hand, 3 parts by weight of tin 2-ehylhexanoate, 0.5 part by weight of dodecylamine, 20 parts by weight of a phthalic acid ester plasticizer and 20 parts by weight of kaolin were mixed to obtain a curing agent composition. The main agent composition and the curing agent composition were mixed to obtain a uniform mixture.

In the same manner as in Example 28, the surface tack free time was measured and found to be 0.5 hour. And the time until the viscosity of the cured product reaches 1600000, was measured and found to be 1.0 hour. Further, the 50% modulus was measured and found to be 2.5 kg/cm$^2$.

Example 61 (Working Example)

To 100 parts by weight of the polymer Q1, 100 parts by weight of colloidal calcium carbonate having a particle size of 0.1 μm, 20 parts by weight of heavy calcium carbonate having a particle size of 2 μm, 20 parts by weight of rutile titanium oxide, 50 parts by weight of a phthalic acid ester plasticizer, 5 parts by weight of a fatty acid amide thixo property giving agent, 1 part by weight of a benzotriazole ultraviolet absorbent, 1 part by weight of hindered phenol antioxidant and 1 part by weight of a hindered amine light stabilizer were added, followed by heat dehydration while kneading. Further, 3 parts by weight of vinyl trimethoxysilane, 1 part by weight of N-(2-aminoethyl)-3-aminopropyl trimethoxysilane and 0.5 part by weight of 3-glycidyloxypropyl trimethoxysilane were added thereto, and the mixture was kneaded under nitrogen atmosphere. 2 Parts by weight of acetylacetonato tin catalyst was added and the mixture was further kneaded to obtain a uniform mixture.

In the same manner as in Example 28, the surface tack free time was measured and found to be 0.3 hour. And the time until the viscosity of the cured product reaches 1600000, was measured and found to be 0.5 hour. Further, the 50% modulus was measured and found to be 6 kg/cm$^2$.

Example 62 (Working Example)

To 100 parts by weight of the polymer Q1, 120 parts by weight of colloidal calcium carbonate having a particle size of 0.1 μm, 20 parts by weight of heavy calcium carbonate having a particle size of 2 μm, 50 parts by weight of a phthalic acid ester plasticizer, 5 parts by weight of bisphenol A-diglycidyl ether type epoxy resin, 3 parts by weight of a hydrogenated castor oil thixo property giving agent, 3 parts by weight of an acrylic acid ester photo-curable resin, 3 parts by weight of a fatty acid epoxy plasticizer, 3 parts by weight of a drying oil, 1 part by weight of a benzotriazole ultraviolet absorbent, 1 part by weight of a hindered phenol antioxidant, 1 part by weight of a hindered amine light stabilizer and 3 parts by weight of phenoxytrimethylsilane were added, and the mixture was kneaded under nitrogen atmosphere, and a main agent composition was obtained.

On the other hand, 3 parts by weight of tin 2-ehylhexanoate, 0.5 part by weight of dodecylamine, 20 parts by weight of a phthalic acid ester plasticizer and 20 parts by weight of kaolin were mixed, and a curing agent composition was obtained. The main agent composition and the curing agent composition were mixed to obtain a uniform mixture.

In the same manner as in Example 28, the surface tack free time was measured and found to be 0.5 hour. And the time until the viscosity of the cured product was reaches 1600000, measured and found to be 1 hour. Further, the 50% modulus was measured and found to be 3 kg/cm$^2$.

INDUSTRIAL APPLICABILITY

The room temperature-setting composition of the present invention is useful for e.g. a sealant, a waterproof agent, an adhesive or a coating agent. It is suitable for a use wherein an adequate cohesion of a cured product itself and a dynamic follow up property to the adherend are required, and it is particularly excellent as an elastic adhesive. Further, it is excellent in curing property, particularly in quick curing property. Therefore, it is useful as a quick curable adhesive or a quick curable sealant.

The room temperature-setting composition of the present invention is excellent in flexibility or work efficiency, and further, it has an effect that it is excellent in curing property so that it can exhibit an adequate strength property in a short period of time. Particularly, it has an effect to provide a cured product wherein the time for bonding is short, and bonding property to various materials is excellent. Further, the room temperature-setting composition containing a polymer composition having both the polymer (A) and the polymer (B), has an effect that it is highly excellent in the initial bonding strength.

What is claimed is:

1. A room temperature-setting composition containing a polyoxyalkylene polymer (A) having a molecular weight of from 8,000 to 50,000 and having hydrolyzable silicon groups of formula (1):

$$—SiX_aR^1{}_{3-a} \quad (1)$$

wherein $R^1$ is a $C_{1\text{-}20}$ substituted or unsubstituted monovalent organic group, X is a hydroxyl group or a hydrolyzable group, provided that when more than one $R^1$ group exists, the plurality of $R^1$ groups may be the same or different, and when more than one X group exists, the plurality of X groups may be the same or different and wherein the polyoxyalkylene polymer contains hydrolyzable silicon groups of formula (1) wherein a is 3 and hydrolyzable silicon groups of formula (1) wherein a is 1 or 2.

2. A room temperature-setting composition containing a polyoxyalkylene polymer (A) having a molecular weight of from 8000 to 50000 and having hydrolyzable silicon groups of formula (1):

$$—SiX_aR^1_{3-a} \qquad (1)$$

wherein $R^1$ is a $C_{1-20}$ substituted or unsubstituted monovalent organic group, X is a hydroxyl group or a hydrolyzable group, provided that when more than one $R^1$ group exists, the plurality of $R^1$ groups may be the same or different, and when more than one X group exists the plurality of X groups may be the same or different, and wherein the polyoxyalkylene polymer (A) contains hydrolyzable silicon groups of formula (1) wherein a is 3 and hydrolyzable silicon groups of formula (1) wherein a is 1 or 2, and a polymer (B) prepared by polymerizing a polymerizable unsaturated group-containing monomer (C).

3. The room temperature-setting composition of claim 2, wherein said polymer (B) is uniformly dispersed in the polyoxyalkylene polymer (A) in the form of fine particles.

4. A room temperature-setting composition containing a combination of (i) a polyoxyalkylene polymer having a molecular weight of from 8,000 to 50,000 and having hydrolyzable silicon groups of formula (1):

$$—SiX_aR^1_{3-a} \qquad (1)$$

wherein $R^1$ is a $C_{1-20}$ substituted or unsubstituted monovalent organic group, X is a hydroxyl group or a hydrolyzable group and a is 1 or 2, provided that when more than one $R^1$ group exists, the plurality of $R^1$ groups may be the same or different, and when more than one X group exists the plurality of X groups may be the same or different, and (ii) a polyoxyalkylene polymer having a molecular weight of from 8,000 to 50,000 and having hydrolyzable silicon groups of the formula —$SiX_3$ wherein X is as defined, and a polymer (B) uniformly dispersed in the polyoxyalkylene polymer in the form of fine particles and prepared by polymerizing a polymenzable unsaturated group-containing monomer (C).

5. A room temperature-setting composition containing a polyoxyalkylene polymer (A) having a molecular weight of from 8,000 to 50,000 and having hydrolyzable silicon groups of formula (1):

$$—SiX_aR^1_{3-a} \qquad (1)$$

wherein $R^1$ is a $C_{1-20}$ substituted or unsubstituted monovalent organic group, X is a hydroxyl group or a hydrolyzable group, provided that when more than one $R^1$ group exists, the plurality of $R^1$ groups may be the same or different, and when more than one X group exists, the plurality of X groups may be the same or different and wherein the polyoxyalkylene polymer contains hydrolyzable silicon groups of formula (1) wherein a is 3 and hydrolyzable silicon groups of formula (1) wherein a is 1 or 2, wherein polyoxyalkylene polymer (A) is prepared by polymerizing an alkylene oxide in the presence of an initiator and a double metal cyanide complex catalyst, followed by modifying the terminals of the polymer.

6. A room temperature-setting composition containing a polyoxyalkylene polymer (A) having a molecular weight of from 8,000 to 50,000, having a $M_w/M_n$ of at most 1.7, and having hydrolyzable silicon groups of formula (1):

$$—SiX_aR^1_{3-a} \qquad (1)$$

wherein $R^1$ is a $C_{1-20}$ substituted or unsubstituted monovalent organic group, X is a hydroxyl group or a hydrolyzable group, provided that when more than one $R^1$ group exists, the plurality of $R^1$ groups may be the same or different, and when more than one X group exists, the plurality of X groups may be the same or different and wherein the polyoxyalkylene polymer contains hydrolyzable silicon groups of formula (1) wherein a is 3 and hydrolyzable silicon groups of formula (1) wherein a is 1 or 2, the polymer being prepared by polymerizing an alkylene oxide in the presence of an initiator, followed by modifying the terminals of the polymer.

7. A room temperature-setting composition containing a polyoxyalkylene polymer (A) having a molecular weight of from 8,000 to 50,000 and having hydrolyzable silicon groups of formula (1):

$$—SiX_aR^1_{3-a} \qquad (1)$$

wherein $R^1$ is a $C_{1-20}$ substituted or unsubstituted monovalent organic group, X is a hydroxyl group or a hydrolyzable group, provided that when more than one $R^1$ group exists, the plurality of $R^1$ groups may be the same or different, and when more than one X group exists the plurality of X groups may be the same or different, and wherein the polyoxyalkylene polymer (A) contains hydrolyzable silicon groups of formula (1) wherein a is 3 and hydrolyzable silicon groups of formula (1) wherein a is 1 or 2, wherein polyoxyalkylene polymer (A) is prepared by polymerizing an alkylene oxide in the presence of an initiator and a double metal cyanide complex catalyst, followed by modifying the terminals of the polymers and a polymer (B) prepared by polymerizing a polymerizable unsaturated group-containing monomer (C).

8. The room temperature-setting composition of claim 7, wherein said polymer (B) is uniformly dispersed in the polyoxyalkylene polymer (A) in the form of fine particles.

9. A room temperature-setting composition containing a polyoxyalkylene polymer (A) having a molecular weight of from 8,000 to 50,000, having a $M_w/M_n$ of at most 1.7, and having hydrolyzable silicon groups of formula (1):

$$—SiX_1R^1_{3-a} \qquad (1)$$

wherein $R^1$ is a $C_{1-20}$ substituted or unsubstituted monovalent organic group, X is a hydroxyl group or a hydrolyzable group, provided that when more than one $R^1$ group exists, the plurality of $R^1$ groups may be the same or different, and when more than one X group exists the plurality of X groups may be the same or different, and wherein the polyoxyalkylene polymer contains hydrolyzable silicon groups of formula (1) wherein a is 3 and hydrolyzable silicon groups of formula (1) wherein a is 1 or 2, the polymer being prepared by polymerizing an alkylene oxide in the presence of an initiator, followed by modifying the terminals of the polymer, and a polymer (B) prepared by polymerizing a polymerizable unsaturated group- containing monomer (C).

10. The room temperature-setting composition of claim 9, wherein said polymer (B) is uniformly dispersed in the polyoxyalkylene polymer (A) in the form of fine particles.

11. A room temperature-setting composition containing a combination of (i) a polyoxyalkylene polymer having a molecular weight of from 8,000 to 50,000 and having hydrolyzable silicon groups of formula (1):

$$—SiX_aR^1_{3-a} \qquad (1)$$

wherein $R^1$ is a $C_{1-20}$ substituted or unsubstituted monovalent organic group, X is a hydroxyl group or a hydrolyzable group and a is 1 or 2, provided that when more than one $R^1$ group exists, the plurality of $R^1$ groups may be the same or different, and when more than one X groups exists the plurality of X groups may be the same or different, and (ii) a polyoxyalkylene polymer having a molecular weight of from 8,000 to 50,000 and having hydrolyzable silicon groups of the formula —SiX$_3$ wherein X is as defined, wherein both polyoxyalkylene polymers (i) and (ii) are prepared by polymerizing an alkylene oxide in the presence of an initiator and a double metal cyanide complex catalyst, followed by modifying the terminals of the polymers, and a polymer (B) uniformly dispersed in the polyoxyalkylene polymer in the form of fine particles and prepared by polymerizing a polymerizable unsaturated group-containing monomer (C).

12. A room temperature-setting composition containing a combination of (i) a polyoxyalkylene polymer having a molecular weight of from 8,000 to 50,000, having a Mw/Mn of at most 1.7 and having hydrolyzable silicon groups of formula (1):

$$-SiX_aR^1_{3-a} \tag{1}$$

wherein $R^1$ is a $C_{1-20}$ substituted or unsubstituted monovalent organic group, X is a hydroxyl group or a hydrolyzable group and a is 1 or 2, provided that when more than one $R^1$ group exists, the plurality of $R^1$ groups may be the same or different, and when more than one X group exists the plurality of X groups may be the same or different, and (ii) a polyoxyalkylene polymer having a molecular weight of from 8,000 to 50,000 and having hydrolyzable silicon groups of the formula —SiX$_3$ wherein X is as defined, the polymers (i) and (ii) being prepared by polymerizing an alkylene oxide in the presence of an initiator, followed by modifying the terminals of the polymers, and a polymer (B) uniformly dispersed in the polyoxyalkylene polymer in the form of fine particles and prepared by polymerizing a polymerizable unsaturated group-containing monomer (C).

* * * * *